(12) United States Patent
Ridgway (10) Patent No.: US 7,103,277 B2
(45) Date of Patent: Sep. 5, 2006

(54) FIBER-TO-THE-PREMISE ARCHITECTURES

(75) Inventor: Richard W. Ridgway, Westerville, OH (US)

(73) Assignee: Optimer Photonics, Inc., Columbus, OH (US)

( * ) Notice: Subject to any disclaimer, the term of this patent is extended or adjusted under 35 U.S.C. 154(b) by 0 days.

(21) Appl. No.: 11/063,022

(22) Filed: Feb. 22, 2005

(65) Prior Publication Data

US 2005/0158050 A1    Jul. 21, 2005

Related U.S. Application Data

(63) Continuation-in-part of application No. 10/935,481, filed on Sep. 7, 2004.

(60) Provisional application No. 60/547,004, filed on Feb. 23, 2004, provisional application No. 60/501,460, filed on Sep. 9, 2003.

(51) Int. Cl.
*H04J 14/00*    (2006.01)
*G02B 6/28*    (2006.01)

(52) U.S. Cl. .......................... 398/72; 385/24; 398/68; 398/69; 398/70; 398/71; 398/87; 398/90

(58) Field of Classification Search ................ 385/24; 398/68–72, 87, 90

See application file for complete search history.

(56) References Cited

U.S. PATENT DOCUMENTS

| | | | |
|---|---|---|---|
| 4,642,804 A | 2/1987 | Personick et al. | |
| 5,221,983 A | 6/1993 | Wagner et al. | |
| 5,542,014 A | 7/1996 | Lerminiaux et al. | |
| 6,067,387 A | 5/2000 | Oh et al. | |
| 6,072,612 A * | 6/2000 | Liou et al. | 398/90 |
| 6,128,422 A | 10/2000 | Hodgson | |
| 6,396,605 B1 | 5/2002 | Heflinger et al. | |
| 6,542,267 B1 * | 4/2003 | Nicholson | 398/59 |
| 6,567,429 B1 * | 5/2003 | DeMartino | 370/539 |
| 6,687,425 B1 | 2/2004 | Ridgway et al. | |
| 6,782,149 B1 | 8/2004 | Ridgway et al. | |
| 6,795,597 B1 | 9/2004 | Ridgway et al. | |
| 6,853,758 B1 | 2/2005 | Ridgway et al. | |
| 2001/0050803 A1 | 12/2001 | Choi et al. | |
| 2003/0090755 A1 * | 5/2003 | Chung et al. | 359/110 |
| 2003/0103759 A1 | 6/2003 | Zappettini et al. | |
| 2003/0165173 A1 | 9/2003 | Helbing et al. | |
| 2004/0008916 A1 | 1/2004 | Ridgway et al. | |
| 2004/0096137 A1 | 5/2004 | Risser et al. | |
| 2004/0131303 A1 | 7/2004 | Nippa et al. | |
| 2004/0184694 A1 | 9/2004 | Ridgway et al. | |
| 2004/0218924 A1 | 11/2004 | Fathallah | |

* cited by examiner

FOREIGN PATENT DOCUMENTS

EP    1 341 333 A    9/2003

*Primary Examiner*—Brian Healy
*Assistant Examiner*—Jerry Martin Blevins
(74) *Attorney, Agent, or Firm*—Dinsmore & Shohl LLP (57) ABSTRACT

An optical architecture is provided comprising a plurality of mod/mux units, a master optical distribution hub, a plurality of additional optical distribution hubs, and a plurality of premise stations. Each of the mod/mux units is configured to (i) permit selective modulation of demultiplexed components of a target wavelength band of an optical signal, (ii) multiplex the selectively modulated optical signal, and (iii) direct the multiplexed signal to the master optical distribution hub. The master optical distribution hub is configured to distribute multiplexed signals from respective ones of the mod/mux units to corresponding ones of the plurality of additional optical distribution hubs. Each of the plurality of additional optical distribution hubs comprises an arrayed waveguide grating configured to demultiplex the multiplexed optical signal and distribute respective distinct wavelength portions of the target wavelength band to respective ones of the premise stations.

26 Claims, 9 Drawing Sheets

FIBER-TO-THE-PREMISE ARCHITECTURES

CROSS-REFERENCE TO RELATED APPLICATIONS

This application claims the benefit of U.S. Provisional Application Ser. No. 60/547,004, filed Feb. 23, 2004 (OPI 0013 MA). This application is also a Continuation-in-Part of U.S. patent application Ser. No. 10/935,481, filed Sep. 7, 2004, which application claims the benefit of U.S. Provisional Application Ser. No. 60/501,460, filed Sep. 9, 2003 (OPI 0009 MA), and 60/547,004, filed Feb. 23, 2004 (OPI 0013 MA).

BACKGROUND OF THE INVENTION

The present invention relates to optical data transfer system architectures and, more particularly, to Fiber-to-the-Premise (FTTP) architectures and components for use therein.

Optical data transfer networks operate according to the general principle that information can be generated, shared, passed on, bypassed, or otherwise manipulated or communicated within a network of data transfer lines. Network applications include LANs, MANs, WANs, SANs, intra-building and interbuilding communications, broadcast distribution, intelligent transportation systems (ITS), telecommunications, supervisory control and data acquisition (SCADA) networks, etc. It has been recognized that optical fiber data transfer lines embody a number of advantages over electrically conductive data transfer lines. Specifically, optical lines offer increased bandwidth, enhanced durability, easier installation, improved immunity to electromagnetic interference, and resistance to harsh environmental conditions. Accordingly, the present invention is directed at providing improved optical architectures for data transfer and, more particularly, to improved schemes for effectuating the transfer of data to and from homes, businesses, and other remote premises.

BRIEF SUMMARY OF THE INVENTION

In accordance with one embodiment of the present invention, an optical architecture is provided comprising a plurality of mod/mux units, a master optical distribution hub, a plurality of additional optical distribution hubs, and a plurality of premise stations. Each of the mod/mux units is configured to (i) permit selective modulation of demultiplexed components of a target wavelength band of an optical signal, (ii) multiplex the selectively modulated optical signal, and (iii) direct the multiplexed signal to the master optical distribution hub. The master optical distribution hub is configured to distribute multiplexed signals from respective ones of the mod/mux units to corresponding ones of the plurality of additional optical distribution hubs. Each of the plurality of additional optical distribution hubs comprises an arrayed waveguide grating configured to demultiplex the multiplexed optical signal and distribute respective distinct wavelength portions of the target wavelength band to respective ones of the premise stations.

In accordance with another embodiment of the present invention, an optical architecture is provided comprising first and second broadband light sources, a mod/mux unit, and a plurality of premise stations in communication with the mod/mux unit via an optical distribution hub. The first light source is configured to generate a target wavelength band of an optical signal. The second light source is configured to generate a bypass wavelength band of the optical signal. The mod/mux unit is configured to (i) permit selective modulation of demultiplexed components of the target wavelength band of the optical signal, (ii) multiplex the selectively modulated optical signal, and (iii) direct the target wavelength band to the optical distribution hub. The optical distribution hub comprises an arrayed waveguide grating configured to demultiplex the multiplexed optical signal and distribute respective distinct wavelength portions of the target wavelength band and respective distinct wavelength portions of the bypass wavelength band to respective ones of the premise stations.

In accordance with yet another embodiment of the present invention, an optical architecture is provided comprising a broadband light source, a mod/mux unit, and a plurality of premise stations in communication with the mod/mux unit via an optical distribution hub. The broadband light source is configured to generate a target wavelength band of an optical signal. The mod/mux unit is configured to permit selective modulation of demultiplexed components of the target wavelength band of the optical signal, multiplex the selectively modulated optical signal, and direct the target wavelength band to the optical distribution hub. The optical distribution hub comprises an arrayed waveguide grating configured to demultiplex the multiplexed optical signal and distribute respective distinct wavelength portions of the target wavelength band to respective ones of the premise stations.

As will be appreciated by those practicing the present invention, the architectures disclosed herein are not intended to be limited to use in particular contexts. For example, a "remote premise" need not be located a substantial distance from the mod/mux units. Indeed, it is contemplated that while architectures according to the present invention are well suited for residential fiber-to-the-home networks, they will also find utility in contexts where the premise stations are located very close to the central mod/mux units, e.g., in an intra-building data transfer network.

Accordingly, it is an object of the present invention to provide improved optical data transfer system architectures. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
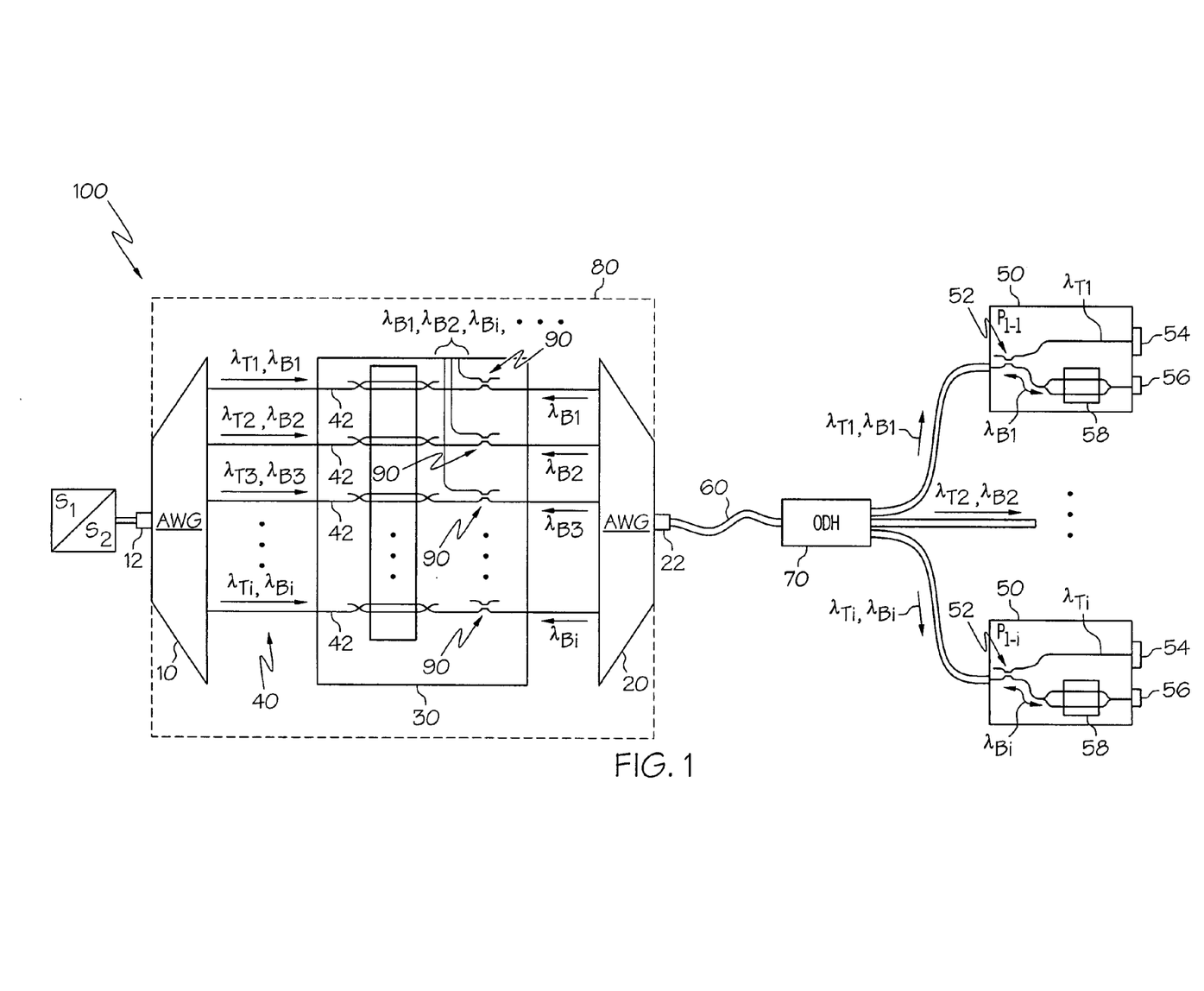
FIG. 1 is a schematic illustration of an optical data transfer system architecture according to one embodiment of the present invention.
Figure 2:
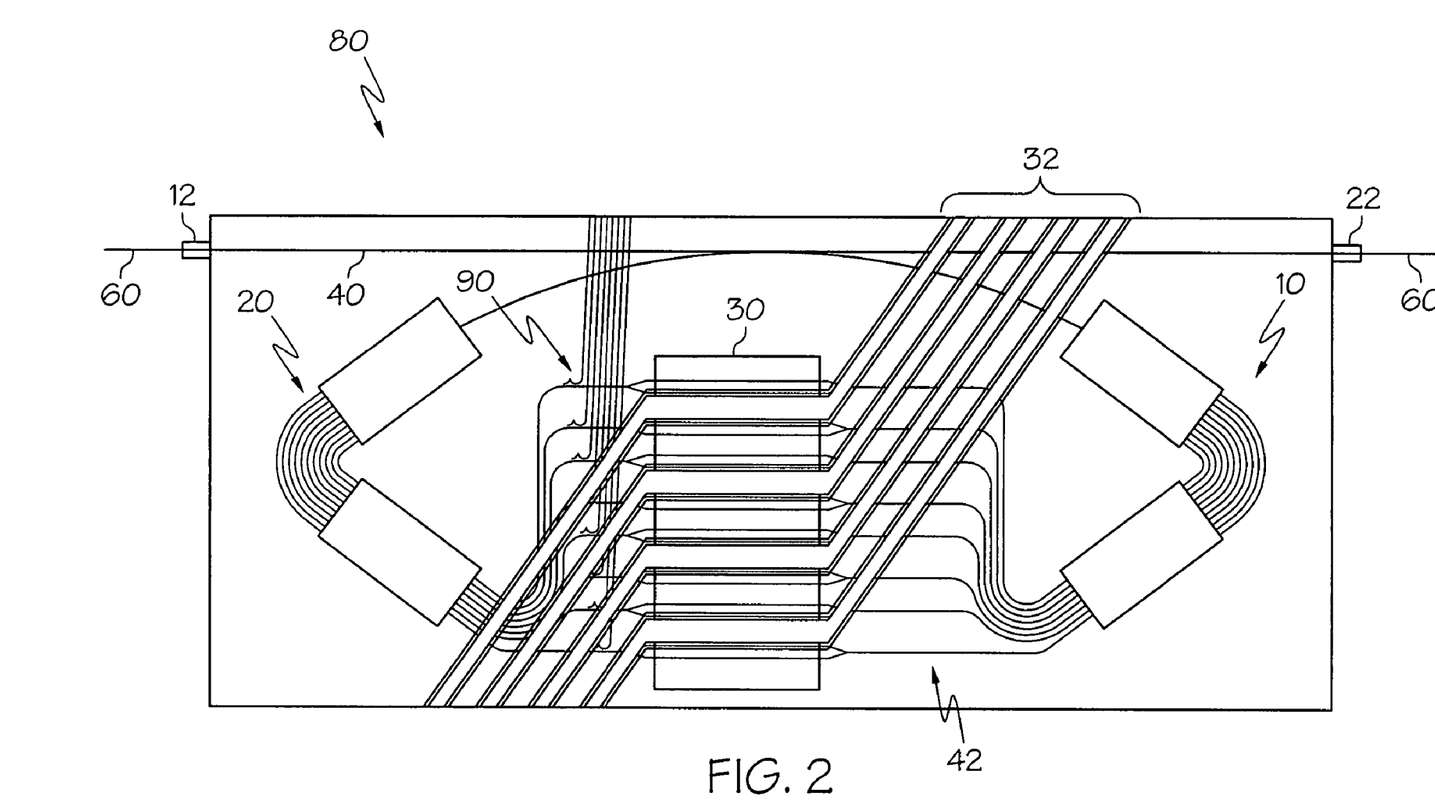
FIG. 2 is a schematic illustration of a planar lightwave circuit according to one embodiment of the present invention.

Referring initially to FIG. 1, an optical architecture 100 according to one embodiment of the present invention is illustrated. Generally, the optical architecture 100 comprises first and second arrayed waveguide gratings 10, 20, a modulator array 30, a plurality of optical waveguides 40, a plurality of premise stations 50 in communication with the remaining system architecture via fiber optic transmission lines 60 and an optical distribution hub 70. As is illustrated in FIGS. 1 and 2, where like components are illustrated with like reference numerals, the first and second arrayed waveguide gratings 10, 20, the modulator array 30, and the associated network of waveguides 40 may be arranged as a stand-alone mod/mux unit 80 defining an optical input 12 and an optical output 22.

The first arrayed waveguide grating 10 is configured to demultiplex an optical signal propagating in a downstream direction from the optical input 12. The optical architecture 100 may comprise one or more broadband light sources $S_1$, $S_2$ coupled to the optical input 12. In this manner, the first arrayed waveguide grating 10 can demultiplex the optical signal from each light source $S_1$, $S_2$ into a plurality of signals of distinct wavelengths. For the purposes of defining and describing the present invention, it is noted that a broadband light source is characterized by a spectral width sufficient to permit wavelength division of the optical signal into a plurality of distinct and separately usable component signals characterized by different optical wavelengths. In this manner, distinct wavelength portions of the optical signal may be carried along respective branches of the waveguide network and may be subject to independent modulation, as is described below with reference to the modulator array 30.

Figure 3:
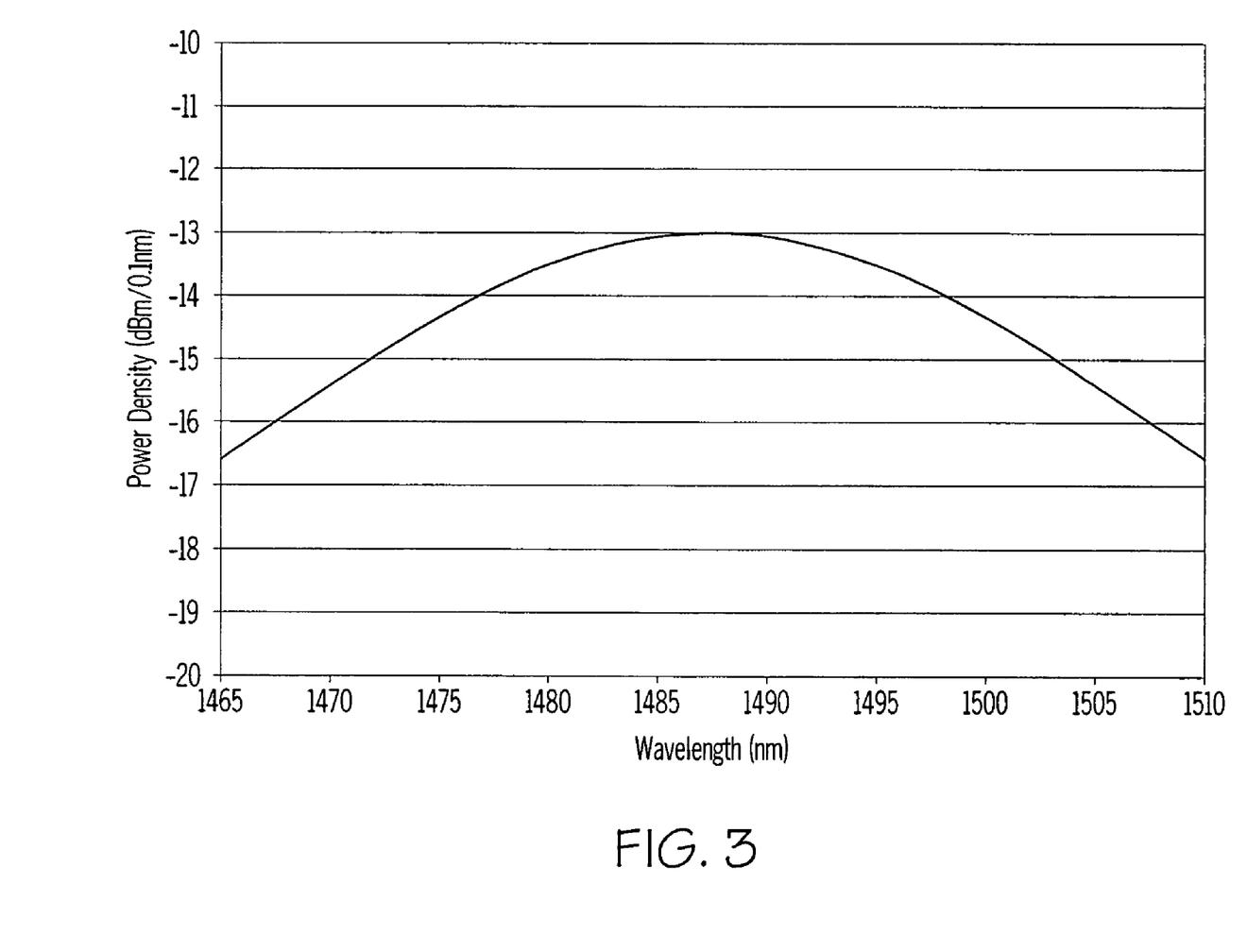
FIG. 3 is a graphical illustration of a broadband light source according to one embodiment of the present invention.

Referring to FIG. 3 by way of example and not by limitation, the broadband light source illustrated therein is characterized by a spectral width of about 40 nm at about 3 dB. Although a variety of suitable spectral widths are contemplated, in many embodiments of the present invention, it may be preferable to ensure that the broadband light source is characterized by a spectral width sufficient to enable the first arrayed waveguide grating to demultiplex the optical signal into a plurality of signals separated from each other by at least about 2 nm. It is noted that a variety of light emitting diodes, e.g., super luminescent light emitting diodes, would be suitable for use as the broadband light source of the present invention, although a variety of suitable broadband light sources exist and are likely to be developed. For the purposes of defining and describing the present invention, it is noted that a light source may comprise an device that generates its own light, e.g, a light emitting diode, or a device that merely serves as a conduit for light, e.g., a fiber optic line.

Where the optical architecture 100 comprises a pair of broadband light sources $S_1$, $S_2$ characterized by two distinct wavelength bands or a single broadband light source configured to define two distinct wavelength bands, the first arrayed waveguide grating 10 can be configured for dual band wavelength division multiplexing. Specifically, the arrayed waveguide grating 10 is configured to superimpose respective wavelength-divided portions of each band on individual branches 42 of the waveguide network extending from the first arrayed waveguide grating 10 to the modulator array 30. For example, the pair of broadband light sources $S_1$, $S_2$ can be centered at different wavelengths so as to define a target wavelength band $\lambda_T$ centered at, e.g., 1550 nm, and a bypass wavelength band $\lambda_B$ centered at, e.g., 1310 nm. Alternatively, a single broadband light source can be configured with suitable optical components to define the two distinct wave bands. As a further alternative, a single broadband light source may be utilized where there is not a need for both the target wavelength band $\lambda_T$ and the bypass wavelength band $\lambda_B$—in which case there would be little or no need for the below-described output coupler 90 or wavelength selectivity of the various components of the architecture 100.

The modulator array 30 can then be configured to modulate individual wavelength portions $\lambda_{T1}$, $\lambda_{T2}$, . . . of the target wavelength band and pass individual wavelength portions $\lambda_{B1}$, $\lambda_{B2}$, . . . of the bypass wavelength band without substantial modulation. As a result, the various wavelength-divided components of the bypass wavelength band can be preserved for downstream modulation at the premise stations 50 and subsequent return via the hub 70, eliminating the need for independent optical sources at the premise stations 50. The source used for generation of modulated signals from the various premise stations 50 need not be located at the premise stations 50 because the relatively low loss components used throughout the architecture 100 allow for transmission of the bypass band along an optical path of significant length.

The modulator array 30 is configured to permit selective modulation of demultiplexed components of the optical signal propagating in the downstream direction along the individual branches 42 of the waveguide network extending from the first arrayed waveguide grating 10 to the modulator array 30. As is illustrated in FIG. 2, the modulator array 30 comprises an array of Mach Zehnder couplers and electrooptic modulators configured for the wavelength selective splitting and modulation. To this end, a suitable array of control electrodes 32 is illustrated in FIG. 2 although it is contemplated that a variety of suitable control electrode configurations may be utilized in practicing the present invention. Similarly, although a variety of modulator configurations may be practiced in the present invention, it is contemplated that the array of electrooptic modulators may comprise respective waveguide cores and optically functional cladding regions optically coupled to the waveguide cores. The respective cladding regions may define a refractive index that is lower than that of the core and may be configured to vary in response to a control signal applied thereto via the control electrodes 32.

It is contemplated that the optically functional cladding regions may include an electrooptic chromophore and may comprise a Pockels effect medium, a Kerr effect medium, or combinations thereof. In a Pockels effect medium, the functional cladding responds to a voltage control signal via the Pockels Effect—an electrooptic effect in which the application of an electric field produces a birefringence that is linear in the applied field. The Pockels Effect can only occur in anisotropic mediums. For a functional polymeric cladding, this anisotropy needed form the Pockels Effect is typically introduced through electric field poling of the cladding. In contrast, un-poled, substantially isotropic, polymer claddings are the most suitable for use in accordance with many embodiments of the present invention because they cannot exhibit the Pockels Effect, so the dominant electrooptic response results from the Kerr Effect—an electrooptic effect in which the application of an electric field produces a birefringence that varies with a square of the magnitude of the applied field or other control signal.

The core material may also comprise a medium where a control signal applied to the electrode pattern alters the velocity, phase, polarization, amplitude, or other transmission characteristic of light propagating along the waveguide core. It is contemplated that many of the embodiments described herein are also applicable for functional electrooptic waveguide cores—with or without functional claddings.

In some particular embodiments of the present invention, it may be preferable to ensure that the optically functional regions of the modulator array 30 comprise a Kerr Effect medium. The Kerr Effect medium can be configured to induce a phase shift $\Delta\phi$ in an optical signal propagating through the optically functional region in response to a suitable control signal. Successive phase shifts $\Delta\phi$ of 180° are induced in the optical signal as a magnitude of the control signal is increased in successive increments. The successive incremental increases in the magnitude of the control voltage decrease in magnitude as the magnitude of the control voltage increases. As a result, relatively small incremental changes in the control voltage can be used to control modulation of the control signal is biased to a sufficiently high value.

The second arrayed waveguide grating 20 is configured to multiplex the demultiplexed and selectively modulated optical signal propagating in the downstream direction from the modulator array 30. The multiplexed optical signal can subsequently be directed to the optical output 12. As is illustrated in FIG. 2, the first and second arrayed waveguide gratings 10, 20, the modulator array 30, and the optical waveguides can be defined on a common substrate of, e.g., silica, silicon, or other like materials, so as to define a planar lightwave circuit (PLC). A variety of suitable waveguide materials are contemplated by the present invention including, but not limited to, silica, silicon, etc. A variety of configurations may also be utilized to form the arrayed waveguide gratings and the functional regions of the modulator array 30. For example, and not by way of limitation, the functional regions may comprise: electrooptically clad silica waveguides; silicon waveguides with electroabsorptive modulators where charge injected into the silicon waveguide makes the waveguide opaque; sol-gel waveguides with electrooptic claddings; lithium niobate waveguides, where the refractive index of the waveguide is dependent upon an applied electric field; and electrooptic polymer waveguides. It is contemplated that electrooptic polymers and other suitable waveguide materials may be utilized throughout the optical architecture 100 of the present invention.

Referring once more to the optical distribution hub 70 and premise stations 50 of FIG. 1, it is noted that the optical distribution hub 70 preferably utilizes a relatively low loss arrayed waveguide grating for demultiplexing the multiplexed optical signal emanating from the optical output 22. The grating of the distribution hub 70 is further configured to distribute distinct wavelength portions of the signal to respective ones of the premise stations 50. In the dual band embodiment described herein, the arrayed waveguide grating of the optical distribution hub 70 is configured such that distinct wavelength portions $\lambda_{T1}$, $\lambda_{T2}$, . . . of the target wavelength band and distinct wavelength portions $\lambda_{B1}$, $\lambda_{B2}$, . . . of the bypass wavelength band are distributed to respective ones of the premise stations 50.

Each premise station 50 is configured to detect a portion $\lambda_{Ti}$ of the target wavelength band $\lambda_T$ via a suitable wavelength selective coupler 52 and detector 54. Further, each premise station 50 is also equipped with a signal reflector 56 and modulator 58 configured to selectively modulate a portion $\lambda_{Bi}$ of the bypass wavelength band $\lambda_B$ and return the selectively modulated portion of the bypass wavelength band $\lambda_B$ to the optical distribution hub 70. The hub 70, in turn, is configured to multiplex the plurality of selectively modulated portions $\lambda_{B1}$, $\lambda_{B2}$, $\lambda_{Bi}$ . . . of the bypass wavelength band returned from the premise stations 50 and direct the multiplexed portions of the bypass wavelength band $\lambda_B$ to the second arrayed waveguide grating 20 in the upstream direction. The specific structures of the coupler 52, detector 54, signal reflector 56, and modulator 58 are beyond the scope of the present invention and may be gleaned from existing or subsequently developed teachings in the art of low loss optical transmission.

The second arrayed waveguide grating 20, which is described above as a multiplexer for downstream signals is also configured to demultiplex upstream signals into selectively modulated portions $\lambda_{B1}$, $\lambda_{B2}$, $\lambda_{Bi}$ . . . of the bypass wavelength band B returned from the premise stations 50. The selectively modulated demultiplexed portions $\lambda_{B1}$, $\lambda_{B2}$, $\lambda_{Bi}$ . . . of the bypass wavelength band $\lambda_B$ returned from the premise stations 50 are then directed to respective upstream signal outputs via respective wavelength selective output couplers 90. The output couplers 90 may be provided as 50/50 optical splitters or another suitable device capable of coupling light in both the downstream and upstream directions. Specifically, in the case of a 50/50 optical splitter, a selectively modulated optical signal traveling downstream towards the second arrayed waveguide grating 20 is split such that 50% of the signal reaches the second arrayed waveguide grating 20 and 50% of the signal is lost. On return from the premises 50 via the hub 70, 50% of the signal is directed towards the output as signals $\lambda_{B1}$, $\lambda_{B2}$, $\lambda_{Bi}$ . . . while the remaining 50% of the signal is lost in the system. As such, the architecture 100 of the present invention provides for the selective modulation of and transmission of input signals in a target wavelength band to the premise stations 50 and for the return of selectively modulated signals in a bypass wavelength band, eliminating the need for separate optical sources at the premise stations 50. It should be appreciated that there would be little need for the output couplers 90 where only a single wavelength band is passed on to the premise stations 50 or where the bypass wavelength band is not returned to the architecture 100 via the second arrayed waveguide grating 20.

Figure 4A:
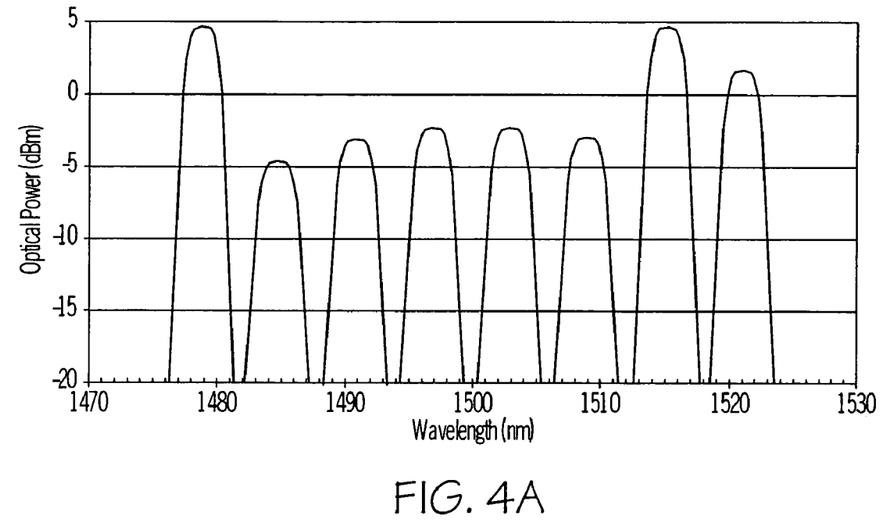
FIGS. 4A and 4B are graphical representations of the operation of a gain equalizer according to one embodiment of the present invention.
Figure 4B:
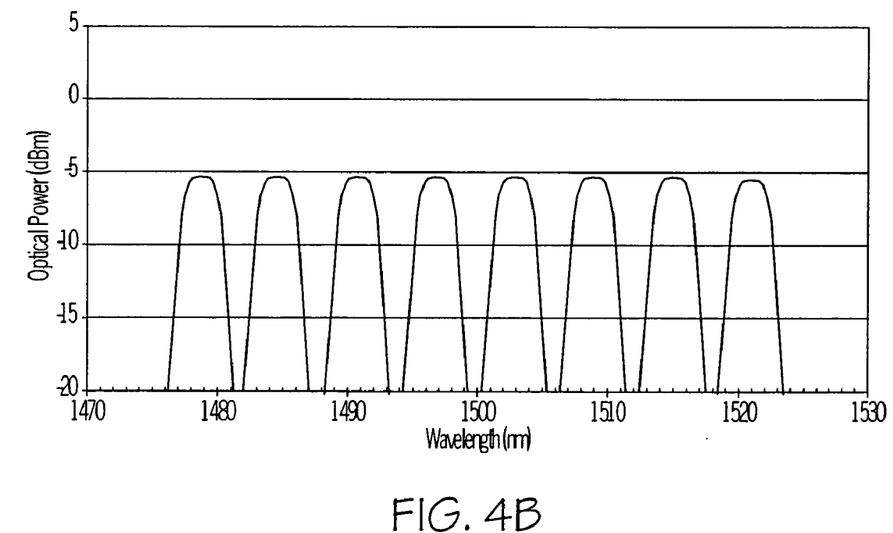

Referring finally to FIGS. 4A and 4B, it is noted that the Mod/Mux unit 80 of FIG. 2 may also be utilized as a gain equalizer if each modulation channel of the modulator array 30 is operated as a variable optical attenuator. Specifically, as will be appreciated by those familiar with waveguide devices utilizing Mach-Zehnder interferometer configurations, thermooptic, electrooptic, or other similar effects can be employed to alter the output power of the various channels of the array 30 through variation of the refractive index of one or both of a pair of waveguide arms forming the interferometer. As a result, the device according to the present invention may be employed to level the power of the respective wavelength-divided optical signals across the array 30.

For example, viewing the Mod/Mux unit 80 of FIG. 2 as an eight channel gain equalizer, FIG. 4A represents the variation in the respective power levels of each input signal across the respective wavelength separated inputs of the array 30. By operating each channel of the array 30 as an independent variable optical attenuator to apply a variable amount of attenuation to the optical signal in the channel, the respective outputs of the signals in each channel of the array 30 may be normalized, as is illustrated in FIG. 4B. Where the Mod/Mux unit 80 of FIG. 2 is operated as an eight channel gain equalizer, it may be preferable to address polarization dependent loss in the variable optical attenuator structure in the manner taught in U.S. Pat. Pub. No. 2002/0008916 A1, the disclosure of which is incorporated herein by reference.

Figure 5:
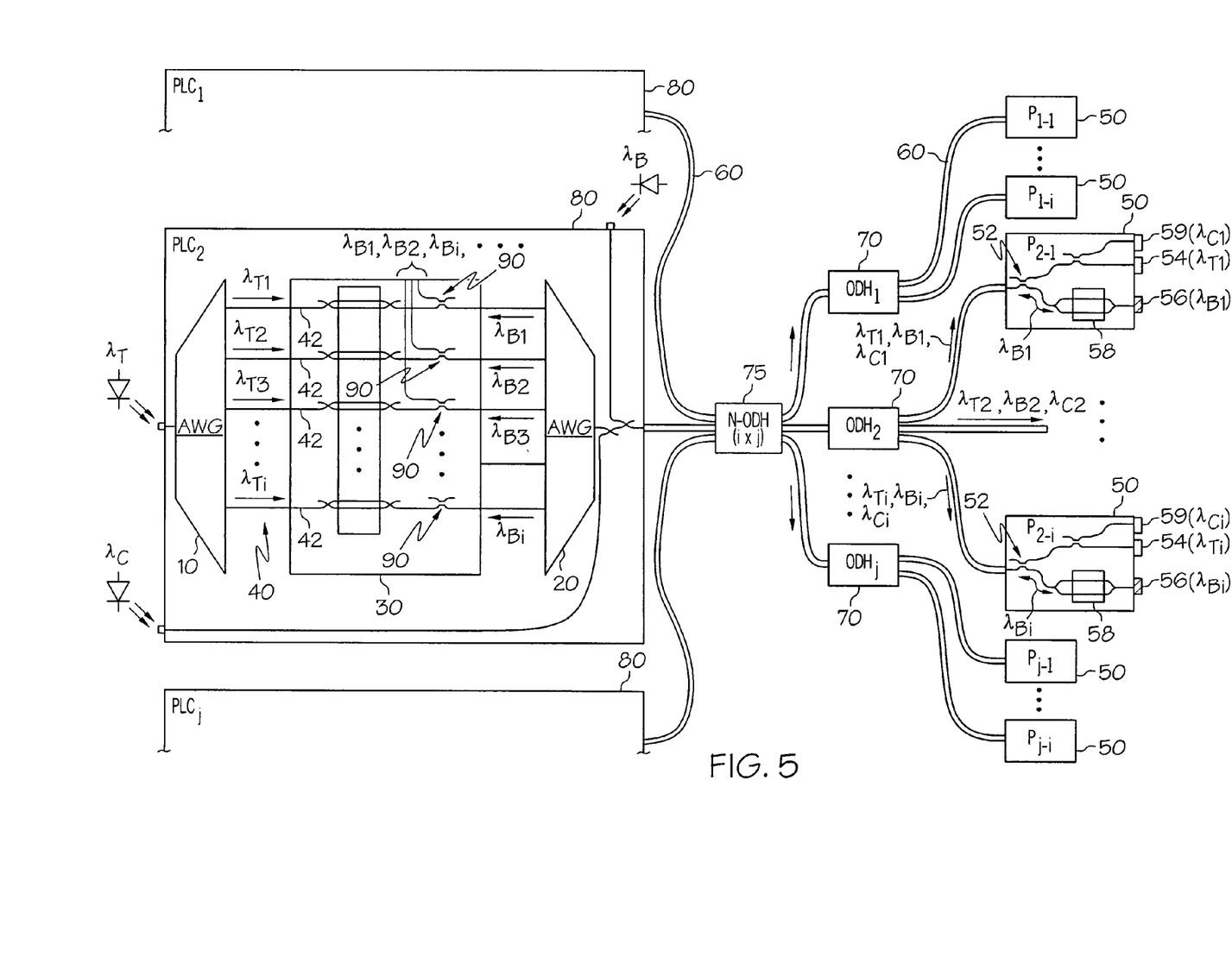
FIG. 5 is a schematic illustration of an optical data transfer system architecture according to another embodiment of the present invention.

The optical architecture illustrated in FIG. 5 differs from that illustrated in FIG. 1 in a number of respects. Specifically, the optical architecture comprises a plurality of mod/mux units 80, as opposed to a single mod/mux unit 80. The architecture of FIG. 5 also includes a master optical distribution hub 75 and a plurality of additional optical distribution hubs 70, as opposed to a single optical distribution hub 70. Each of the optical distribution hubs 70 services a corresponding plurality of premise stations 50.

Additionally, we note that in the embodiment of FIG. 5, a second broadband light source is provided to introduce the bypass wavelength band $\lambda_B$ downstream of the modulator array 30. In this manner, it is not necessary to ensure that the individual wavelength portions $\lambda_{B1}$, $\lambda_{B2}$, . . . of the bypass wavelength band $\lambda_B$ pass through the modulator array 30 without modulation. It is contemplated that the bypass wavelength band $\lambda_B$ may be coupled into the architecture in a variety of suitable optical coupling mechanisms, some of which are recited above. For example, in the illustrated embodiment, the bypass wavelength band $\lambda_B$ is coupled via a 50/50 splitter. While this will only send about half of the usable signal downstream, it will allow half of any upstream data to be sent through the second arrayed waveguide grating 20.

The optical architecture illustrated in FIG. 5 further comprises a light source configured to define a signal $\lambda_C$ for common transmission to a plurality of the premise stations 50. For example, the signal $\lambda_C$ may comprise a cable television signal that is transmitted in common form to a number of premise stations. Of course, each of the premise stations 50 will comprise a detector 59 responsive to the common signal $\lambda_C$. As is illustrated in FIG. 5, the optical architecture is configured such that the common signal $\lambda_C$ is directed to the premise stations 50 via the master optical distribution hub 75 and the additional optical distribution hubs 70. Although in the illustrated embodiment, the signal $\lambda_C$ is fed into the data stream using a wavelength selective coupler that couples the $\lambda_C$ band without effecting the target or bypass bands $\lambda_T$, $\lambda_B$ it is contemplated that the signal $\lambda_C$ may be introduced into the architecture in a variety of suitable manners.

The mod/mux units 80 illustrated in FIG. 5 are similar to the mod/mux unit 80 illustrated in FIG. 1 in that each is configured to (i) permit selective modulation of demultiplexed components of a target wavelength band $\lambda_T$ of an optical signal and (ii) multiplex the selectively modulated optical signal. However, the architecture of FIG. 5 is configured such that the multiplexed signals from each mod/mux unit 80 are directed to the master optical distribution hub 75. The master optical distribution hub 75 distributes the multiplexed signals to corresponding additional optical distribution hubs 70. Each of the additional optical distribution hubs 70 comprises an arrayed waveguide grating configured to demultiplex the multiplexed optical signal and distribute respective distinct wavelength portions of the target wavelength band $\lambda_T$ to respective ones of the premise stations 50. The use of arrayed waveguide gratings in the optical distribution hubs 70 represents an efficient mechanism for power distribution because the channel loss is typically 3–5 dB, as opposed to the 15 dB typically attributed to an optical splitter.

Where j mod/mux units 80 are provided, each having the capacity to generate i selectively modulated signals, the architecture illustrated in FIG. 5 has the capacity to serve i×j premise stations 50. For example, and not by way of limitation, it is contemplated that the mod/mux units 80 could be configured to create 32 component signals having a spectral width of about 1 nm and channel spacing of about 1.5 nm from a broadband light source having a spectral width of about 80 nm (1450 nm to 1530 nm). Thus, a "neighborhood" of 2048 premise stations could be served by a panel of 64 mod/mux units 80, one master optical distribution hub 75, and 64 additional optical distribution hubs 70.

Figure 6:
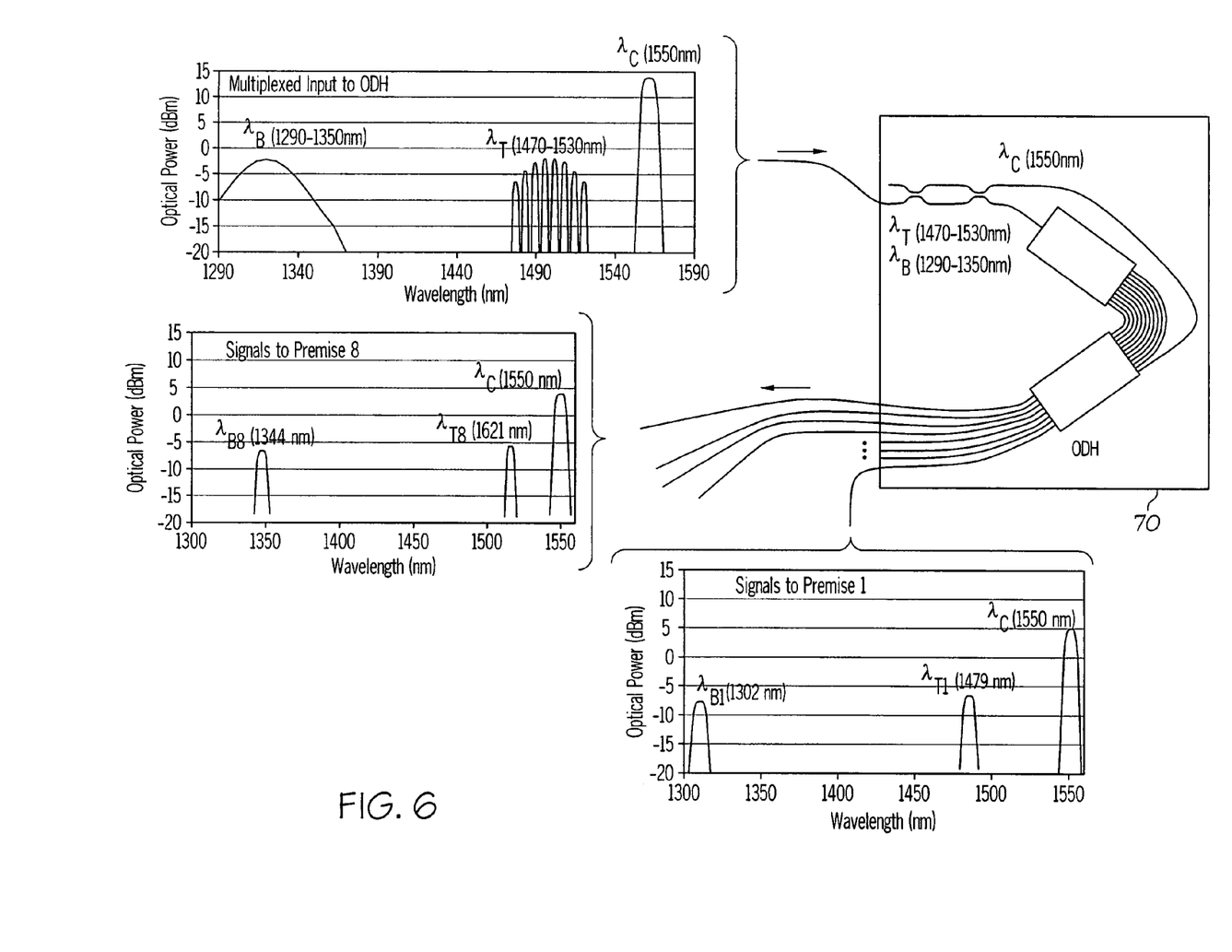
FIG. 6 is an illustration of the downstream functionality of an optical distribution hub according to the embodiment of the present invention illustrated in FIG. 5.
Figure 7:
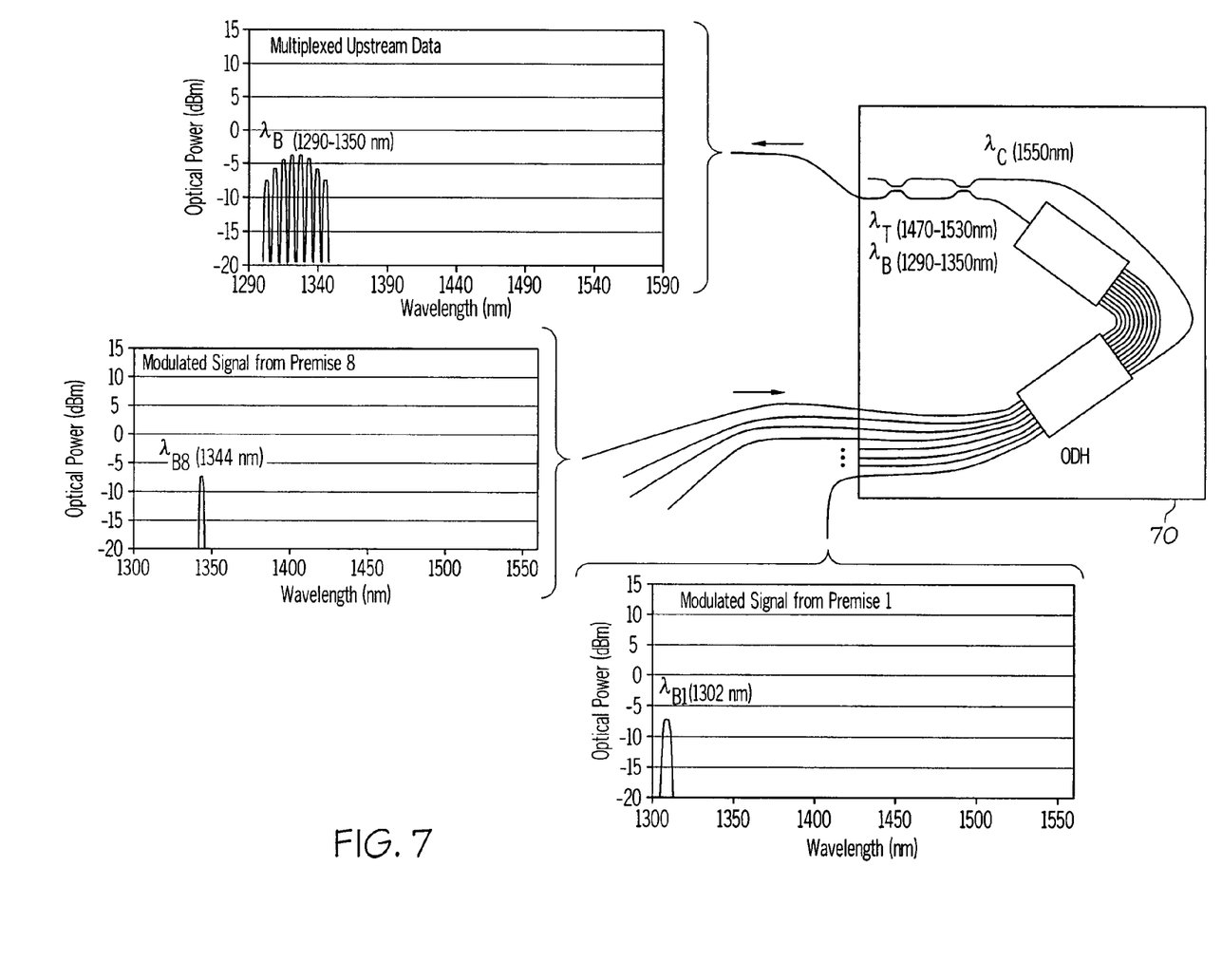
FIG. 7 is an illustration of the upstream functionality of an optical distribution hub according to the embodiment of the present invention illustrated in FIG. 5.

The downstream and upstream functionality of the optical distribution hubs 70 is illustrated in further detail in FIGS. 6 and 7. Specifically, referring to the downstream functionality illustrated in FIG. 6, a multiplexed signal from the master optical distribution hub 75 is input to the optical distribution hub 70 and comprises the unmodulated, broadband bypass wavelength band $\lambda_B$, the selectively modulated and multiplexed components of the target wavelength band $\lambda_T$, and the common signal. The arrayed waveguide grating of the optical distribution hub 70 distributes respective distinct wavelength portions of the bypass wavelength band $\lambda_B$ and the target wavelength band $\lambda_T$ to respective ones of the premise stations 50 served by the hub 70. A wavelength selective coupler can be utilized to direct the common signal $\lambda_C$ such that it bypasses the arrayed waveguide grating of the optical distribution hub 70. The respective component signals $\lambda_{B1}$, $\lambda_{B8}$, $\lambda_{T1}$, $\lambda_{T8}$ and the common signal $\lambda_C$ for premises 1 and 8 are presented in FIG. 6 for illustrative purposes only. Those practicing the present invention will appreciate that the specific wavelength values attributable to each band will be subject to the preferences and requirements associated with the particular context in which the concepts of the present invention are utilized. Preferably, each band should occupy mutually exclusive portions of the optical spectrum.

Turning to the upstream functionality illustrated in FIG. 7, each of the premise stations 50 read the data on the downstream signal by detecting the respective component signals $\lambda_{T1}$, . . . $\lambda_{T8}$ of the target wavelength band $\lambda_T$. In addition, each of the premise stations 50 are configured to selectively modulate the distinct wavelength portions $\lambda_{B1}$, . . . $\lambda_{B8}$ of the bypass wavelength band $\lambda_B$ and direct the selectively modulated portions of the bypass wavelength band $\lambda_B$ upstream to the optical distribution hub 70. The optical distribution hub 70 multiplexes the upstream optical signal and directs it to the corresponding mod/mux unit 80 via the master optical distribution hub 75. The mod/mux unit 80 subsequently demultiplexes the multiplexed upstream optical signal received from the master optical distribution hub 75 and makes it available for further distribution in the manner illustrated in FIG. 5 (see $\lambda_{B1}$, $\lambda_{B2}$, $\lambda_{Bi}$, . . . ).

Figure 8:
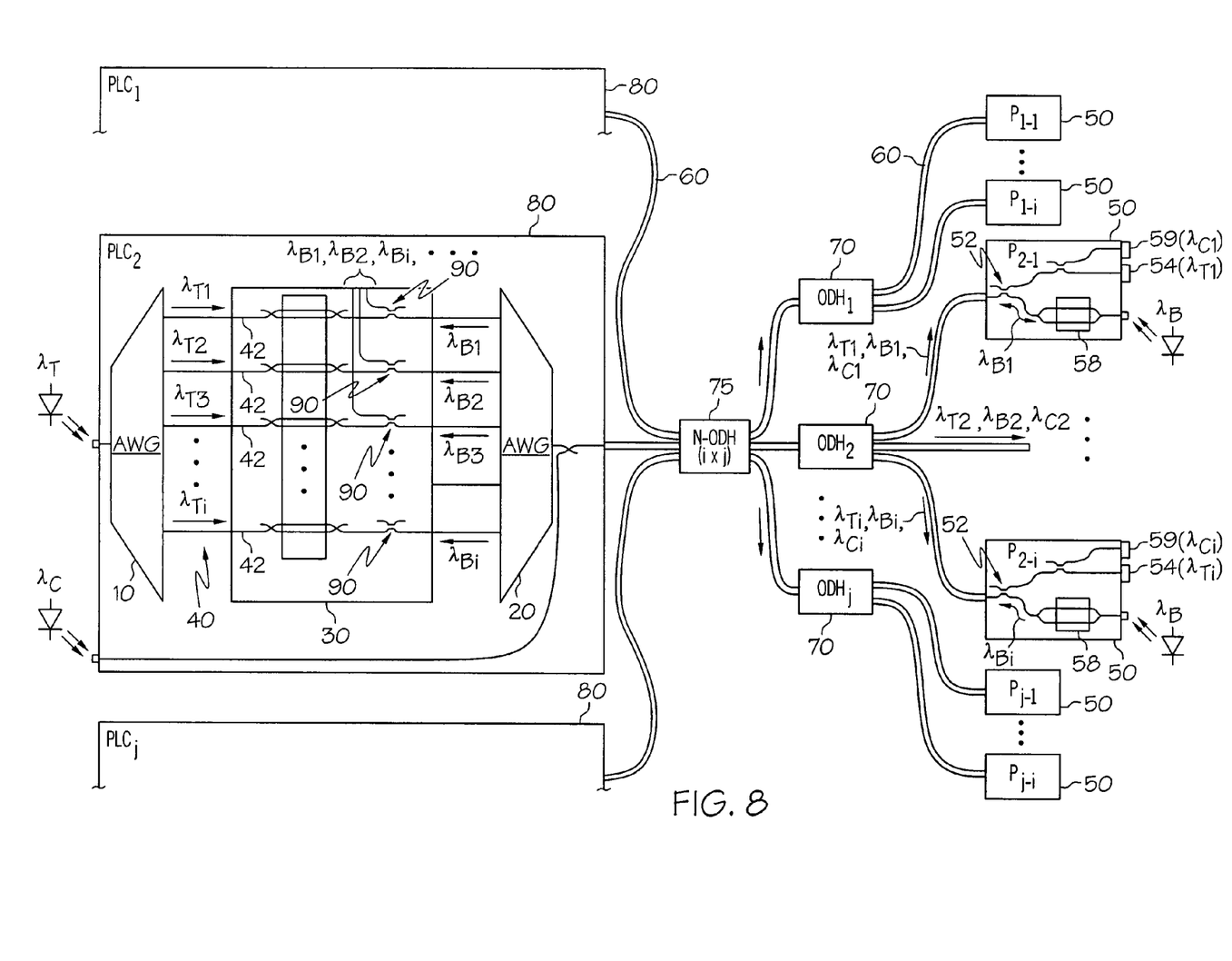
FIG. 8 is a schematic illustration of an optical data transfer system architecture according to yet another embodiment of the present invention.
Figure 9:
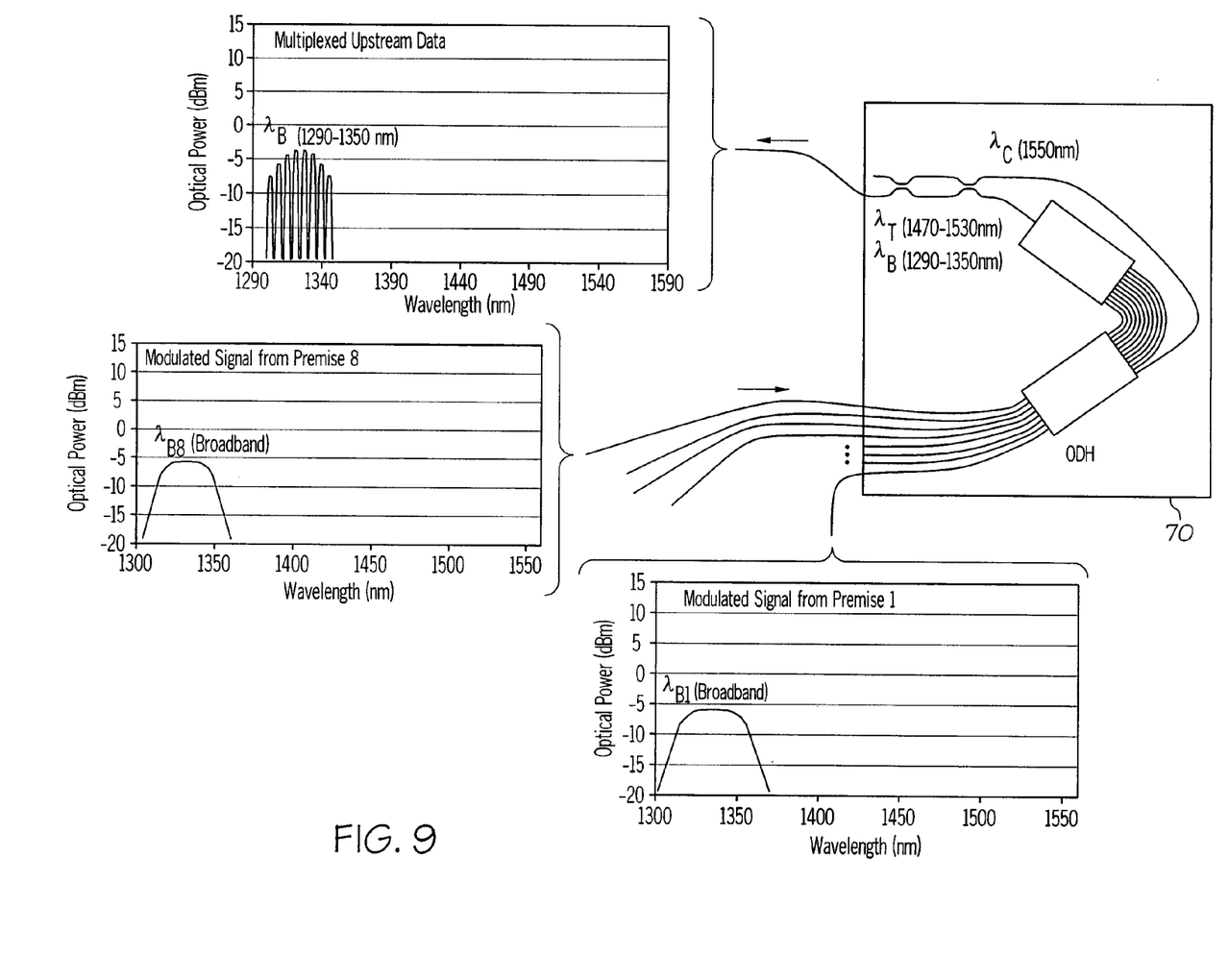
FIG. 9 is an illustration of the downstream functionality of an optical distribution hub according to the embodiment of the present invention illustrated in FIG. 8.

The architecture of FIG. 8 illustrates an embodiment of the present invention where respective sources for providing the bypass wavelength band $\lambda_B$ are provided at the premise stations 50. The resulting upstream functionality of the embodiment of FIG. 8 is illustrated in FIG. 9. Specifically, each of the sources provided at the premise stations 50 may comprise a broadband light source $\lambda_B$ and each premise station 50 can be provided with hardware to selectively modulate upstream optical signals from the additional light sources $\lambda_B$. The selectively modulated upstream signals $\lambda_{B1}, \ldots \lambda_{B8}$ from the premise stations $P_1 \ldots P_8$ can then be are directed to the optical distribution hub 70. The arrayed waveguide grating of the optical distribution hub 70 effectively slices and multiplexes distinct portions of the broadband signals from the sources $\lambda_B$ to yield the wavelength discriminated, multiplexed upstream data illustrated in FIG. 9. For example, the arrayed waveguide grating acts as a filter to select only the 1350 nm portion of the upstream modulated broadband signal $\lambda_{B8}$ from premise 8, the 1290 nm portion of the upstream modulated broadband signal $\lambda_{B1}$ from premise 1, and respective signal portions therebetween for premises 2–7. The grating also multiplexes each of these signal portions and directs the multiplexed data upstream in the manner described above with respect to FIGS. 5 and 7.

For the purposes of defining and describing the present invention, it is noted that the wavelength of "light" or an "optical signal" is not limited to any particular wavelength or portion of the electromagnetic spectrum. Rather, "light" and "optical signals," which terms are used interchangeably throughout the present specification and are not intended to cover distinct sets of subject matter, are defined herein to cover any wavelength of electromagnetic radiation capable of propagating in an optical waveguide. For example, light or optical signals in the visible and infrared portions of the electromagnetic spectrum are both capable of propagating in an optical waveguide. An optical waveguide may comprise any suitable signal propagating structure. Examples of optical waveguides include, but are not limited to, optical fibers, slab waveguides, and thin-films used, for example, in integrated optical circuits. For the purposes of defining and describing the present invention, it is noted that a planar lightwave circuit is a device that incorporates a waveguide fabricated in or on a flat material such as, for example, a thin film of silica or silicon.

Although many embodiments of the present invention are illustrated herein with reference to optical signal splitters and combiners in the form of directional coupling regions, it is noted that the present invention contemplates utilization of any suitable conventional or yet to be developed structure for optical signal splitting or combining. For example, suitable alternative structures for splitting and combining optical signals include, but are not limited to, 2×2 directional coupling regions, 1×2 directional coupling regions, 1×2 Y signal splitters and combiners, and 1×2 and 2×2 multimode interference element splitters and combiners. The specific design parameters of these structures are beyond the scope of the present invention and may be gleaned from existing or yet to be developed sources, including U.S. Pat. Pub. No. 2004/0008916 A1, the disclosure of which is incorporated herein by reference.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. Further, it is noted that the term "substantially" is utilized herein to represent the inherent degree of uncertainty that may be attributed to any quantitative comparison, value, measurement, or other representation.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. An optical architecture comprising a plurality of mod/inux units, a master optical distribution hub, a plurality of additional optical distribution hubs, and a plurality of premise stations, wherein:
    each of said mod/unix units is configured to selectively modulate demultiplexed components of a target wavelength band of an optical signal,
        multiplex said selectively modulated optical signal, and
        direct said multiplexed signal to said master optical distribution hub;
    said master optical distribution hub is configured to distribute multiplexed signals from respective ones of said mod/mux units to corresponding ones of said plurality of additional optical distribution hubs;
    each of said plurality of additional optical distribution hubs comprises an arrayed waveguide grating configured to demultiplex said multiplexed optical signal and distribute respective distinct wavelength portions of said target wavelength band to respective ones of said premise stations.

2. An optical architecture as claimed in claim 1 wherein said optical architecture further comprises a broadband light source configured to define said target wavelength band.

3. An optical architecture as claimed in claim 2 wherein said broadband light source is characterized by a spectral width sufficient to enable said mod/mux units to demultiplex said optical signal into at least eight signals of respective wavelengths separated by at least about 1 nm.

4. An optical architecture as claimed in claim 1 wherein each of said premise stations comprises a detector responsive to said selective modulation of said components of said target wavelength band.

5. An optical architecture as claimed in claim 1 wherein said arrayed waveguide gratings of each of said plurality of additional optical distribution hubs is further configured to distribute respective distinct wavelength portions of a bypass wavelength band to respective ones of said premise stations.

6. An optical architecture as claimed in claim 5 wherein respective ones of said premise stations are configured to selectively modulate said distinct wavelength portions of said bypass wavelength band and direct said selectively modulated portions of said bypass wavelength band upstream to respective ones of said additional optical distribution hubs.

7. An optical architecture as claimed in claim 6 wherein:
    said additional optical distribution hubs are configured to multiplex upstream optical signals from respective sets of premise stations; and
    said architecture is configured to direct said multiplexed upstream optical signals to corresponding one of said plurality of mod/mux units via said master optical distribution hub.

8. An optical architecture as claimed in claim 7 wherein said rood/mux units are configured to demultiplex said multiplexed upstream optical signals from said master optical distribution hub.

9. An optical architecture as claimed in claim 1 wherein:
said optical architecture further comprises additional light sources arranged at respective ones of said premise stations; and
said premise stations are configured to selectively modulate upstream optical signals from said additional light sources.

10. An optical architecture as claimed in claim 9 wherein:
said architecture is configured such that said selectively modulated upstream signals from said premise stations are directed to respective ones of said additional optical distribution hubs; and
each of said additional optical distribution hubs is configured to wavelength discriminate and multiplex said selectively modulated upstream signals.

11. An optical architecture as claimed in claim 10 wherein said architecture is configured to direct said multiplexed upstream signals to a corresponding one of said plurality of mod/mux units via said master optical distribution hub.

12. An optical architecture as claimed in claim 11 wherein said mod/mux units are configured to demultiplex said multiplexed upstream optical signals from said master optical distribution hub.

13. An optical architecture as claimed in claim 1 wherein said optical architecture further comprises a light source configured to define a signal $\lambda_C$ for common transmission to a plurality of said premise stations.

14. An optical architecture as claimed in claim 13 wherein each of said premise stations comprises a detector responsive to said common signal $\lambda_C$.

15. An optical architecture as claimed in claim 14 wherein said optical architecture is configured such that said common signal $\lambda_C$ is directed to said premise stations via said master optical distribution hub and said additional optical distribution hubs.

16. An optical architecture as claimed in claim 15 wherein said optical architecture is configured such that said common signal $\lambda_C$ bypasses said arrayed waveguide grating of said additional optical distribution hubs.

17. An optical architecture as claimed in claim 1 wherein:
said optical architecture further comprises first and second broadband light sources configured to define said target wavelength band and a bypass wavelength band; and
said target wavelength band and said bypass wavelength band are substantially mutually exclusive with respect to the range of wavelengths defined within each band.

18. An optical architecture as claimed in claim 17 wherein:
said optical architecture further comprises a light source defining a signal $\lambda_C$ for common transmission to a plurality of said premise stations; and
said signal $\lambda_C$ for common transmission to said plurality of said premise stations is centered on a wavelength that is exclusive of said target wavelength band and said bypass wavelength band.

19. An optical architecture as claimed in claim 1 wherein said architecture is configured such that a number of demultiplexed components of said target wavelength band of said optical signal is at least as great as a number of premise stations served by individual ones of said additional optical distribution hubs.

20. An optical architecture as claimed in claim 1 wherein said architecture is configured such that respective ones of said demultiplexed components of said target wavelength band of said optical signal within respective mod/mux units are directed to individual premise stations within a set of premise stations served by individual ones of said additional optical distribution hubs.

21. An optical architecture as claimed in claim 1 wherein said architecture is configured such tat a number of said mod/mux units is at least as great as a number of said additional optical distribution hubs.

22. An optical architecture as claimed in claim 1 wherein said architecture is configured such tat respective ones of said multiplexed signals from said mod/mux units are directed to individual ones of said additional optical distribution hubs via said master optical distribution hub.

23. An optical architecture comprising first and second broadband light sources, a mod/mux unit, and a plurality of premise stations in communication with said mod/mux unit via an optical distribution hub, wherein:
said first light source is configured to generate a target wavelength band of an optical signal;
said second light source is configured to generate a bypass wavelength band of said optical signal;
said mod/mux unit is configured to
selectively modulate demultiplexed components of said target wavelength band of said optical signal,
multiplex said selectively modulated optical signal, and
direct said target wavelength band to said optical distribution hub; and
said optical distribution hub comprises an arrayed waveguide grating configured to demultiplex said multiplexed optical signal and distribute respective distinct wavelength portions of said target wavelength band and respective distinct wavelength portions of said bypass wavelength band to respective ones of said premise stations.

24. An optical architecture as claimed in claim 23 wherein said second light source is configured to introduce said bypass wavelength band downstream of a portion of said mod/mux unit configured for said selective modulation and multiplexing of said target wavelength band of said optical signal.

25. An optical architecture comprising a broadband light source, a mod/mux unit, and a plurality of premise stations in communication with said mod/mux unit via an optical distribution hub, wherein:
said broadband light source is configured to generate a target wavelength band of an optical signal;
said mod/mux unit is configured to
selectively modulate demultiplexed components of said target wavelength band of said optical signal,
multiplex said selectively modulated optical signal, and
direct said target wavelength band to said optical distribution hub; and
said optical distribution hub comprises an arrayed waveguide grating configured to demultiplex said multiplexed optical signal and distribute respective distinct wavelength portions of said target wavelength band to respective ones of said premise stations.

26. An optical architecture as claimed in claim 1 wherein each of said mod/unix units is further configured to generate said demultiplexed components of said target wavelength band by demultiplexing said optical signal.

* * * * *

UNITED STATES PATENT AND TRADEMARK OFFICE
CERTIFICATE OF CORRECTION

PATENT NO. : 7,103,277 B2
APPLICATION NO. : 11/063022
DATED : September 5, 2006
INVENTOR(S) : Richard W. Ridgway Page 1 of 1

It is certified that error appears in the above-identified patent and that said Letters Patent is hereby corrected as shown below:

Col. 10, Claim 1, lines 14-15 "mod/inux" should read as -- mod/mux --

Col. 10, Claim 1, line 18 "mod/inux" should read as -- mod/mux --

Col. 11, Claim 8, line 2 "rood/mux" should read as -- mod/mux --

Col. 12, Claim 21, line 7 "tat" should read as -- that --

Col. 12, Claim 22, line 11 "tat" should read as -- that --

Col. 12, Claim 26, line 63 "mod/unix" should read as -- mod/mux --

Signed and Sealed this

Third Day of April, 2007

JON W. DUDAS
*Director of the United States Patent and Trademark Office*